United States Patent [19]

Thomson et al.

[11] Patent Number: 4,845,206

[45] Date of Patent: Jul. 4, 1989

[54] PRODUCTION OF CELLULOSE ETHERS USING A PREMIX OF ALKALI AND ETHERIFYING AGENT

[75] Inventors: Timothy Thomson; Cindy J. Jones, both of Baton Rouge, La.

[73] Assignee: The Dow Chemical Company, Midland, Mich.

[21] Appl. No.: 52,645

[22] Filed: May 21, 1987

[51] Int. Cl.$^4$ ............................ C08B 1/06; C08B 1/08
[52] U.S. Cl. .......................................... 536/84; 536/91; 536/99; 536/100
[58] Field of Search ...................... 536/84, 91, 99, 100

[56] References Cited

U.S. PATENT DOCUMENTS

| | | | |
|---|---|---|---|
| 2,101,262 | 12/1937 | Maxwell | 536/100 |
| 2,426,561 | 8/1947 | Musser | 536/100 |
| 4,015,067 | 3/1977 | Liu et al. | 536/96 |
| 4,254,258 | 3/1981 | Durso | 536/98 |
| 4,426,518 | 1/1984 | Omiya | 536/98 |
| 4,460,766 | 7/1984 | Feicht et al. | 536/84 |
| 4,501,887 | 2/1985 | Kornrumpf et al. | 536/84 |

*Primary Examiner*—John Kight
*Assistant Examiner*—Frederick Krass
*Attorney, Agent, or Firm*—Llewellyn A. Proctor, Sr.; Paul D. Hayhurst

[57] ABSTRACT

A process for the preparation of a cellulose ether by reacting in a heterogenous reaction mixture an alkaline solution and an etherifying agent with a fibrous cellulose. The total of the required stoichiometric amount of the alkaline solution and at least a portion of the etherifying agent required in producing the cellulose ether are admixed (e.g. in a mixing nozzle) at sufficiently low temperature to suppress reaction between the alkaline solution and the etherifying agent. The admixture is then contacted with the cellulose fibers, preferably by spraying the admixture thereupon. Additional of the etherifying agent if required is then added to the reaction mixture, and the heterogenous reaction mixture is agitated and reacted at an initial temperature below 40° C. sufficient to produce alkalization of the cellulose. Thereafter the temperature is increased above 40° C., preferably incrementally or gradually up to about 100° C., preferably to 80° C., to produce etherification of the cellulose and form the cellulose ether.

17 Claims, No Drawings

PRODUCTION OF CELLULOSE ETHERS USING A PREMIX OF ALKALI AND ETHERIFYING AGENT

FIELD OF THE INVENTION

This invention relates to a process for the preparation of cellulose ethers, especially methylcellulose and methylethylhydroxypropylhydroxycellulose ethers.

BACKGROUND OF THE INVENTION

Cellulose ethers are conventionally prepared in two stages, viz (1) an alkalization stage wherein an alkali is reacted with cellulose to prepare an alkali cellulose, and (2) an etherification stage wherein an etherifying agent is reacted with the alkali cellulose to form the cellulose ether product. Dispersing agents or solvents are sometimes added to one or both stages to obtain better mixing. Typically cellulose in finely divided state is reacted in a first stage with an alkaline solution, e.g. an alkali metal hydroxide, the alkaline solution generally being sprayed upon the cellulose fiber and reacted therewith in an alkalization reaction to form the alkali cellulose. The alkali cellulose is reacted in a second stage with an etherifying agent in an etherification reaction to form the cellulose ether.

In the alkalization reaction the reactor is vigorously stirred, e.g. in a heterogenous reaction medium, to mix the alkali and cellulose as uniformly as possible, and generally the reaction is carried out at low, often ambient, temperature. The oxygen partial pressure is controlled to suppress or promote polymer degradation. In general, the alkalization reaction is conducted at temperatures up to about 30° C.

The etherification reaction is conducted, e.g. in a heterogenous reaction medium, by heating the alkali cellulose together with the etherifying agent to produce the cellulose ether. The etherification reaction is generally conducted at temperatures ranging from about 30° C. to 100° C. with simultaneous vigorous stirring of the reactants to obtain as uniform substitution and good yield of the cellulose ether as possible with as little consumption as possible of the etherifying agent.

In conducting the alkalization and etherification reactions, the two stages constituting the process have conventionally been conducted in the same reaction vessel, or in separate reaction vessels. In either, the reactants are sequentially added. In the former, after formation of the alkali cellulose by reaction between the alkali and cellulose, the etherifying agent is then added to the same vessel to convert the alkali cellulose intermediate to cellulose ether. In the latter, the alkali cellulose is passed from the first vessel to the second vessel, or zone of the series to which the etherifying agent is added to form the cellulose ether. The two stage operation better lends itself to a continuous operation. All of the reactants might also be added with the cellulose to a single reaction vessel and the reactants treated, with stirring, to carry out the process in a batch operation. The batch operation also requires two steps; a first step at low temperature to produce the alkali cellulose and then, in a second step, the operation is conducted at higher temperature to produce the cellulose ether.

In the production of cellulose ethers from these heterogenous reaction mixtures, beginning with the initial step of preparing the alkali cellulose, an inherent difficulty is presented in that the volume of the cellulose fiber relative to that of the alkali metal hydroxide is massive for which reason it is extremely difficult if indeed possible to properly, much less completely disperse the alkali metal hydroxide upon the cellulose. A tremendous surface area is presented by the cellulose, and the hydroxide reaction sites on the anhydro-D-glucose units of the cellulose with which the alkali metal hydroxide must react to form the alkali cellulose are widespread. It is nonetheless essential to achieve a high degree of uniformity of substitution of the hydrogen of the hydroxyl groups of the anhydro-D-glucose units of the cellulose by the alkali metal. The substitution must be as complete and uniform as possible to obtain a cellulose ether with a minimum residue of insoluble components. In order to obtain better dispersion of the alkali metal hydroxide within the alkaline solution, increasing the amount of the alkali metal hydroxide proves ineffective because this leads to increased side reaction between the alkali metal hydroxide and the etherifying agent requiring, inter alia, excessive amounts of the etherifying agents with consequent debits to the process. Dilution of the alkaline solution with water to obtain better alkali metal dispersion, on the other hand, is likewise ineffective because yields are also adversely affected. Moreover, the use of organic solvents to obtain better dispersion of the alkali presents limitations in that the solvents can be absorbed into the cellulose and cannot be displaced by the alkali, this effectively reducing the amount of cellulose available for reaction. Further, the solvent can react with the etherifying agents, thus competing with reaction between the etherifying agent and the cellulose so that the yield of cellulose ether is reduced. Furthermore, the addition and use of any diluent or solvent in the process must be recovered, and hence can constitute a burden unless the beneficial effect can offset this burdensome consequence.

OBJECTS

It is nonetheless a primary objective of this invention to provide an improved process wherein, in the production of cellulose ethers from heterogenous reaction mixtures by reaction of an alkaline solution, or alkali metal hydroxide with fibrous cellulose, and an etherifying agent, better dispersion of the alkali metal hydroxide with the fibrous cellulose is obtained.

In particular, it is an object of this invention to provide an improved process, as characterized, wherein higher yields and more uniform substitution are achieved, to provide a cellulose ether product with a lower residue of insoluble components.

A further object is to provide an improved process, as characterized, which attains better dispersion of the alkali metal hydroxide upon the fibrous cellulose with the use of minimal amount of solvents, if any, or dispersing agents, if any, which are not essential in the principal reaction.

THE INVENTION

These objects and others are achieved in accordance with the present invention embodying improvements in a process for the preparation of cellulose ethers by reaction between an alkaline solution, especially an alkali metal hydroxide, and cellulose, and an etherifying agent, in a heterogenous reaction medium, by (i) admixing together the total of the required stoichiometric amount of the alkali, or alkali metal hydroxide, and at least a portion of the required etherifying agent, and optionally a solvent or surfactant, or both, to be employed in producing the cellulose ether at temperature sufficiently low to suppress side reactions between the alkali metal hydroxide and etherifying agent, and then (ii) dispersing said mixture upon the fibrous cellulose, and additional of the etherifying agent, if required, while agitating and reacting said mixture and fibrous cellulose at temperature and pressure sufficient to form a cellulose ether product which has a lesser amount of insoluble components as contrasted with that produced in a process otherwise similar, at similar conditions except that the alkali and etherifying agent are not mixed prior to contact with the cellulose. Suitably, the alkali, or alkali metal hydroxide, and etherifying agent, and solvent or surfactant if any, are thoroughly agitated and admixed one with the other in a first zone or chamber at temperatures up to 40° C., preferably from about 20° C. up to about 40° C., and more preferably from about 20° C. to about 30° C. at autogenous pressure. The mixture is then withdrawn from said first zone, or chamber, and sprayed in a second zone, upon the fibrous cellulose. Additional etherifying agent is added to the reaction mixture if required, as when less than the full amount of the etherifying agent required in the reaction is not premixed with the alkali. The admixture of reactants and cellulose, essentially as a damp powder, is agitated and reacted within said second zone, or chamber, at temperature and pressure sufficient to form the cellulose ether. The reaction within the second zone is generally conducted at temperature ranging above 40° C. to about 100° C., preferably above 40° C. to about 80° C., at autogenous pressures. Pressures are not controlled but generally range between about 50 pounds per square inch gauge (psig)(344.7 kilopascals (kPa)) and about 250 psig(1723.7 kPa), preferably from about 100 psig(689.5 kPa) and 180 psig(1241 kPa), dependent to some extent on the specific cellulose ether which is formed, and the nature of the specific reactants employed in the reaction. The uniformity of substitution, and quality of the cellulose ether product are considerably improved as a result of the better distribution of the alkali metal hydroxide upon the fibrous cellulose as contrasted with conventional processes employed to produce the same cellulose ether with similar reactants at generally corresponding temperatures, at autogenous or controlled pressures.

It has been found that the alkali, or alkali metal hydroxide, mixed with at least about 25 percent of the stoichiometric amount of the etherifying agent required in the etherification reaction is sufficient to reduce the amount of insoluble components of the cellulose ether product as contrasted with a process otherwise similar, at similar conditions except that the alkali and etherifying agent are not premixed, or mixed prior to contact and reaction with the cellulose. In general, in carrying out the process of this invention, the total amount of the alkali to be used in the reaction is mixed with at least about 25 percent up to 100 percent, and preferably from about 25 percent to about 50 percent, of the required stoichiometric amount of the etherifying agent to be employed in the reaction prior to contact of the mixture with the cellulose. If less than the total amount of the etherifying agent required in the preparation of the cellulose ether is not premixed with the alkali, or alkali metal hydroxide, to form the alkali-etherifying agent mixture sprayed upon the cellulose, then the balance of the etherifying agent required to carry out the reaction is added as a separate stream to the cellulose reaction mixture to carry out the etherification reaction. Solvent and surfactant, if any, can also be added as a separate stream to the cellulose reaction mixture.

In accordance with this process, the entire stoichiometric amount of the alkali metal hydroxide which is to be employed in the preparation of the cellulose ether is premixed with and diluted with at least a portion of the etherifying agent to be employed in the reaction. The etherifying agent, or agents, and solvent or surfactant if employed in this mixture, increase the volume of the alkali metal hydroxide relative to the volume of the cellulose as a result of which better and more even dispersion or the alkali metal hydroxide is attained with more of the alkali metal hydroxide reacting with the hydrogen of the anhydrous-D-glucose units of the cellulose.

In conducting the process of this invention, the total of the alkali solution required for forming the cellulose ether, and optionally in addition a solvent or surfactant and etherifying agent are thoroughly admixed in a first zone, or chamber, generally at a temperature up to 40° C., preferably within a range of from about 20° C. up to 30° C. The alkali is thus thoroughly dispersed, admixed or emulsified within the etherifying agent, and solvent or surfactant if any to be employed in production of the cellulose ether. Suitably, this mixture can be formed by the use of a spray nozzle into an inlet side, or sides, of which the alkaline solution, or alkali metal hydroxide, and the etherifying agent are introduced, and optionally a solvent or surfactant, to form an emulsion or aerosol within which the alkaline solution, or alkali metal hydroxide, is dispersed. The emulsion or aerosol mixture, within which the alkaline solution is dispersed, is contacted preferably by spraying the emulsion or aerosol via a nozzle outlet into a second zone, or chamber onto the finely divided fibrous cellulose. Within the second zone or chamber also, the mixture of finely divided cellulose, alkaline solution, etherifying agent, and solvent or surfactant if added, is vigorously stirred along with additional etherifying agent if required to maintain a wetted heterogenous mass, or wetted powder during the alkalization and etherification reactions. In carrying out the process, the starting temperatures is maintained within a range of from about 20° up to 40° C., suitably from about 20° to about 30° C., and when the alkalization reaction is essentially completed the temperature is raised gradually or incrementally in accordance with a temperature profile suitable for conducting the etherification reaction. The etherification reaction is conducted at temperatures ranging above about 40° C. to about 100° C., preferably above about 40° C. to about 80° C. Autogenous pressure is maintained throughout both the alkalization and etherification reactions.

In the production of cellulose ethers the viscosity of the product and the time period required for the alkalization is controlled largely by the type of cellulose employed as a raw-material, and by the oxygen partial pressure. In general however, the alkalization reaction is essentially completed in an initial phase over a period ranging from about 0.1 hour to about 0.25 hours, preferably from about 0.15 hour to about 0.20 hours. Cellulose ethers of viscosity ranging from about 50 centipoise (cp)(0.05 pascal-second (Pa.s)) to about 75,000 cp (75 Pa.s) are generally produced from alkali cellulose made during these time periods, viscosity changes from one end of the scale to another generally being controlled by the cellulose type and the imposed oxygen partial pressure. The etherification reaction is conducted by incrementally increasing the temperature from above 40° C. to about 100° C., preferably from above 40° C. to about 80° C., gradually or incrementally. The peak temperature achieved is generally maintained for a period ranging from about 0.5 hour to about 2 hours, preferably from about 0.75 hour to about 1.25 hours.

The cellulose employed in the practice of this invention can be derived entirely from conventional sources, wood pulps from which the non-cellulosic materials have been separated, regenerated celluloses, linter pulp, e.g. cotton linters, bagasse and the like.

The alkali solution employed for alkalization of the cellulose can be virtually any strong alkali, dissolved in water, the alkali metal hydroxides being those commonly employed, exemplary of which are lithium hydroxide, sodium hydroxide, potassium hydroxide and the like. The alkali metal hydroxides are by far the most cost effective of commercially available materials, though other alkaline solutions are suitable, e.g. a quaternary ammonium base, ammonium hydroxide and the like. The aqueous solution of an alkaline hydroxide is generally employed in such quantity that the amounts of alkali metal hydroxide and water, respectively, contained in the treated cellulose are from about 1 mole to about 4 moles, preferably from about 2 moles to about 3 moles, and from about 1 mole to 10 moles, preferably from about 2 moles to about 6 moles, respectively, per the hydroxyl groups contained in the anhydro-D-glucose units of the cellulose. The preferred concentration of the aqueous solution of alkali metal hydroxide employed ranges from about 30 percent to about 55 percent, preferably from about 45 percent to about 50 percent, based on the weight of the solution.

A solvent or diluent inert at reaction conditions can be employed if desired to further aid in the dispersion of the alkali solution. Suitable solvents are exemplified by glycols, e.g. diethylene glycol monomethyl ether; aromatic hydrocarbons, e.g. benzene, toluene, xylene and the like; aliphatic hydrocarbons, e.g. hexane, heptane and the like; and ketones, e.g. methyl ethyl ketone and the like. The solvent, if employed, is added to the reaction mixture in concentration ranging from about 0.25 parts to about 2 parts, per part of cellulose.

A surface active agent can also be employed, if desired. Exemplary of useful surfactants are, e.g, organic phosphate esters such as is available on the market, EMPHOS PS-236 (WITCO) and GAFAC RD-510 (GAF) and Nonylphenoxypoly-(ethyleneoxy)ethanols, e.g. IGEPAL CO-430 (GAF).

The etherifying agent, or agents, employed in the reaction is determined by the cellulose ether to be produced, and any of a wide range of such agents are useful in producing a cellulose ether having a unitary substituent, e.g. methylcellulose, or two or more different substituents, e.g. methlethylhydroxypropylhydroxycellulose. Methods for the preparation of cellulose ethers are per se generally well known, and the cellulose ethers are prepared generally by the principle of (a) Williamson's ether synthesis by reaction between cellulose and alkyl or aralkyl halides, with consumption of an alkali, and/or (b) by reacting cellulose with an epoxide in the presence of catalytic quantities of an alkali, or (c) by reacting cellulose with activated reactants in the presence of catalytic quantities of an alkali. The nature of these reactions and a listing exemplary of cellulose ethers prepared in this manner are described at columns 1 and 2 of U.S. Pat. No. 4,501,887 which issued on Feb. 26, 1985 to Wolfgang Kornrumph et al., herewith incorporated by reference. This patent also provides a background discussion of the present state of the art. Other patent references exemplary of the state-of-the-art are, e.g., U.S. Pat. Nos. 4,015,067; 4,254,258; 4,460,766 and 4,426,518.

When alkyl halides such as methyl, ethyl, propyl halides are used as etherifying agents, the amount of the alkyl halide employed generally ranges from about 0.25 parts to about 2 parts, preferably from about 0.5 parts to about 1.6 parts, based on the weight of the cellulose. Equivalent weight parts of other etherifying agents can also be employed, based on the stoichiometry of the etherification reaction, e.g. as when higher molecular weight alkyl halides are employed, or an admixture of etherifying agents are employed to produce mixed ethers.

The invention, and its principle and mode of operation will be more fully understood by reference to the following examples, and comparative runs, presenting data illustrating its more salient features. All parts are given in terms of weight except as otherwise expressed.

EXAMPLES

A series of four runs were made, twenty pounds of cotton linters of 20–25 micrometer ($\mu$m) average particle diameter having been first charged in each instance into a horizontal reaction vessel. Two of the runs were made in accordance with the process of this invention (Runs 1 and 2) and two in accordance with prior art procedures (Runs 3 and 4). In the runs made in accordance with the present invention the alkali metal hydroxide, and a portion of the etherifying agent, and solvent, were throughly premixed in a first run (Run 1) by passage through a nozzle of conventional type manufactured by Spraying Systems Co. of Wheaton, IL, U.S.A. (Model No. ⅜K. 50), a nozzle commonly used for spraying caustic solutions, and in the second run, Run 2, by passage through an atomizing nozzle of composite structure manufactured by Spraying Systems Co. of Wheaton, IL, U.S.A. (Model No. fluid cap #60100/air cap #140-6-37-70° ) to form in Run 1 an emulsion, and in Run 2 an atomized spray which is contacted with the cotton linters.

In the conventional runs, Runs 3 and 4, respectively, the alkali metal hydroxide was first contacted in a reaction vessel with a charge of the cotton linters by spraying the alkali metal hydroxide at 30° C. through a conventional caustic spray nozzle as employed in Run 1, and the alkali metal hydroxide reacted over a period of 10 minutes at 30° C. with the cotton linters, while stirring, to form the alkali metal cellulose. The etherifying agent and solvent, after all of the alkali metal hydroxide had been added to the reaction vessel, was then added via the nozzle to the vessel containing the alkali metal cellulose.

In conducting all of these runs, both Runs 1 and 2 and Runs 3 and 4, respectively, methylethylhydroxypropyl-hydroxycellulose ether was prepared from the cotton linters by reaction with sodium hydroxide, propylene oxide and methyl chloride. The methyl chloride was added in part as a recycle stream of vent gas constituted of 30 percent methyl chloride, and 70 percent dimethyl ether. In Run 1 a stream of the sodium hydroxide was emulsified and sprayed upon the cotton linters as an emulsion of 50 percent NaOH and vent gas (containing 5 percent of a phosphate ester surfactant) within which was additionally added the propylene oxide and methyl chloride. In Run 2 the sodium hydroxide was added as an aerosol by spraying the sodium hydroxide and vent gas through the atomizing nozzle. In each of Runs 1 and 2, twenty six percent of the etherifying agent employed in the reaction was premixed with the sodium hydroxide, and the balance of the etherifying agent required in the reaction (seventy four percent) was added separately to the reaction mixture. The load in pounds is given for each of the four runs in Table I.

TABLE I

| Load (pounds): | |
| --- | --- |
| sodium hydroxide | 24.8 |
| vent Gas[(1)] | 13.3 |
| propylene oxide | 5.8 |
| methyl chloride | 18.4 |
| cellulose | 20.0 |

[(1)]Thirty percent methyl chloride and 70 percent dimethylether.

In all runs the total blend time for the sodium hydroxide was 10 minutes, while the temperature was maintained initially at 30° C. and finally at 40° C. during the sodium hydroxide blend period, whether the sodium hydroxide was added prior to or simultaneously with the vent gas, propylene oxide and methyl chloride.

Table II gives the temperature rate of change for each of the four runs subsequent to the initial 10 minute period wherein, (1) in Runs 1 and 2 all of the sodium hydroxide was added via addition of the sodium hydroxide in admixture with the vent gas, and (2) in Runs 3 and 4, the sodium hydroxide was directly added, and thereafter, at the end of the 10 minute period, in all of Runs 1, 2, 3 and 4, the balance of the reaction components were added. Table II thus describes for all four runs the temperature ramps after all of the reactants described in Table I have been loaded into the reactor, viz. the temperature in Centigrade degrees at the beginning and end of a given period, and the duration in time for each of the periods.

TABLE II

| Temperature Ramps After Reactor Loaded With Reactants | | |
| --- | --- | --- |
| Start °C. | End °C. | Time (minutes) |
| 30 | 40 | 20 |
| 40 | 45 | 15 |
| 45 | 53 | 15 |
| 53 | 57 | 40 |
| 57 | 80 | 50 |
| 80 | 80 | 60 |

The product quality analysis for each of the four individual runs is given in Table III.

TABLE III

| Product Quality Analysis | Run #1 | Run #2 | Run #3 | Run #4 |
| --- | --- | --- | --- | --- |
| Fiber Rating | 3 | 3 | 5 | 6 |
| Percent Solids | <0.05 | <0.05 | <0.05 | 0.35 |
| Color/Haze | 1/1 | 1/1 | 1/1 | 1/1 |
| One Percent Viscosity (Centipoise) | 6,271 | 8,410 | 9,156 | 11,600 |

These data thus clearly show profound advantages for the process of this invention (Runs 1 and 2) vis-a-vis the prior art process (Runs 3 and 4). The fiber rating achieved in both Runs 1 and 2, demonstrating the process of this invention, thus shows only a 3 whereas in Runs 3 and 4 there is a 5 fiber rating and 6 fiber rating, respectively. Fiber ratings are representative of the grams of pulp contained in 100 milliliters of a 2 percent methylethylhydroxypropylhydroxycellulose ether solution. A 5 rating represents a solution containing four times more pulp than a solution having a 3 rating, and a 6 rating represents a solution containing 8 times more pulp than a solution having a 3 rating. In both Runs 1 and 2 the percent solids, and color/haze tests are well within acceptable limits, albeit the percent solids of the product is higher in Run 4.

Preferred cellulose ethers produced in accordance with this invention are methylcellulose and methylethylhydroxypropylhydroxycellulose ethers. Suitably in the productions of a methylcellulose ether, cellulose is reacted with an alkali metal hydroxide and methyl chloride. In the production of the methyl cellulose ether, the alkali metal hydroxide is dispersed within or admixed with the methyl chloride, and solvent if a solvent is to be employed, and the admixture then contacted with the fibrous cellulose, preferably by spraying the admixture upon the cellulose, initially at alkalization temperature. In the production of the methylethylhydroxypropylhydroxycellulose ether an admixture of ethylene oxide, propylene oxide and methyl chloride within which the alkali metal hydroxide is dispersed is contacted with the fibrous cellulose, preferably sprayed upon the cellulose, initially at alkalization temperature. After alkalization of the cellulose is substantially completed, the temperature is then gradually or incrementally raised to produce etherification of the alkali cellulose.

It is apparent that various modifications and changes can be made as in the concentration, identity of the specific reactives and in reaction conditions without departing the spirit and scope of the present invention.

Having described the invention, what is claimed is:

1. In a process for the preparation of a cellulose ether in an alkalization stage wherein an alkaline solution is sprayed upon and reacted with a powdered fibrous cellulose to form an alkali cellulose, and an etherification stage wherein an etherifying agent, in admixture with the alkali cellulose, essentially as a damp powder, is agitated and reacted to form a cellulose ether product, the improvement comprising, introducing into and premixing in a nozzle the total of the required stoichiometric amount of the alkaline solution and at least about 25 percent of the stoichiometric amount of the etherifying agent required in producing the cellulose ether, while maintaining the admixture at a temperature sufficient to suppress reaction between said alkaline solution and said etherifying agent, withdrawing said admixture as a spray containing atomized droplets of said alkaline solution from the mixing nozzle, spraying said admixture of alkaline solution and etherifying agent upon the cellulose at an initial temperature sufficient to produce alkalization of the cellulose, while agitating said cellulose in said reaction mixture inclusive of the stoichiometric amounts of the alkaline solution, etherifying agent and cellulose as a damp powder, and thereafter increasing the temperature of the reacting mixture to form the cellulose ether.

2. The process of claim 1 wherein the etherifying agent is premixed with the alkaline solution, prior to spraying said admixture upon the cellulose, in concentration ranging from about 25 percent to about 100 percent of the stoichiometric amount of the etherifying agent required in the reaction.

3. The process of claim 2 wherein the etherifying agent is premixed with the alkaline solution in concentration ranging from about 25 percent to about 50 percent.

4. The process of claim 1 wherein the alkalization reaction is conducted at a temperature ranging from about 20° C. up to 40° C., and the etherification reaction is conducted at temperature ranging above 40° C. to about 100° C.

5. The process of claim 4 wherein the temperature of the etherification reaction ranges from above 40° C. to about 80° C.

6. The process of claim 1 wherein the temperature of the alkalization reaction ranges from about 20° C. up to 40° C. and this temperature is maintained for a period ranging from about 0.1 hour to about 0.25 hours sufficient to substantially complete alkalization of the cellulose, and thereafter the etherification reaction is conducted by incrementally or gradually increasing the temperature above 40° C. to about 100° C., and the peak temperature is maintained over a period of from about 0.5 hour to about 2 hours.

7. The process of claim 6 wherein the temperature of the alkalization reaction ranges from about 20° C. to about 30° C., and the temperature of the etherification reaction ranges from about a low of about 40° C. to a high of about 80° C.

8. The process of claim 7 wherein the alkalization reaction is conducted over a period ranging from about 0.15 hour to about 0.20 hours, and the peak temperature of the etherification reaction is maintained over a period of from about 0.75 hour to about 1.25 hours.

9. The process of claim 1 wherein the cellulose ether produced is methyl cellulose, the methyl cellulose having been produced by reaction between the cellulose, methyl chloride and an alkali metal hydroxide.

10. The process of claim 1 wherein the cellulose ether produced is, methylethylhydroxypropylhydroxycellulose, the methylethylhydroxypropylhydroxycellulose having been produced by reaction between the cellulose an admixture of ethylene oxide, propylene oxide and methyl chloride and an alkali metal hydroxide.

11. In a process for the preparation of a cellulose ether product in an alkalinization stage wherein an alkali metal hydroxide solution is sprayed upon and reacted with a powdered fibrous cellulose to form an alkali cellulose, and an etherification stage wherein an etherifying agent comprised of methyl chloride, in admixture with the alkali cellulose, essentially as a damp powder, is agitated and reacted to form a cellulose ether product, the improvement comprising,
introducing into and premixing in a mixing nozzle the total of the required stoichiometric amount of the alkali metal hydroxide solution and at least about 25 percent of the stoichiometric amount of the methyl chloride etherifying agent required in producing the cellulose ether, while maintaining the admixture at a temperature sufficient to suppress reaction between said alkali metal hydroxide solution and said methyl chloride etherifying agent, withdrawing said admixture as a spray containing atomized droplets of the alkali metal hydroxide from the mixing nozzle, spraying said admixture of alkali metal hydroxide solution and methyl chloride etherifying agent upon the cellulose at an initial temperature sufficient to produce alkalization of the cellulose, while agitating said cellulose in said reaction mixture inclusive of stoichiometric amounts of the alkali metal hydroxide solution, methyl chloride etherifying agent and cellulose as a damp powder, and thereafter increasing the temperature of the reacting mixture to form the methyl cellulose ether.

12. The process of claim 11 wherein the alkalization reaction is conducted at a temperature ranging from about 20° C. up to 40° C., and the etherification reaction is conducted at temperature ranging above 40° C. to about 100° C.

13. The process of claim 12 wherein the temperature of the etherification reaction ranges from above 40° C. to about 80° C.

14. The process of claim 11 wherein the temperature of the alkalization reaction ranges from about 20° C. up to 40° C. and this temperature is maintained for a period ranging from about 0.1 hour to about 0.25 hours sufficient to substantially complete alkalization of the cellulose, and thereafter the etherification reaction is conducted by incrementally or gradually increasing the temperature above 40° C. to about 100° C., and the peak temperature is maintained over a period of from about 0.5 hour to about 2 hours.

15. The process of claim 14 wherein the temperature of the alkalization reaction ranges from about 20° C. to about 30° C., and the temperature of the etherification reaction ranges from about a low of about 40° C. to a high of about 80° C.

16. The process of claim 15 wherein the alkalization reaction is conducted over a period ranging from about 0.15 hour to about 0.20 hours, and the peak temperature of the etherification reaction is maintained over a period of from about 0.75 hour to about 1.25 hours.

17. The process of claim 11 wherein the cellulose ether produced is methylethylhydroxypropylhydroxycellulose, the methylethylhydroxypropylhydroxycellulose having been produced by reaction between the cellulose, an admixture of ethylene oxide, propylene oxide and methyl chloride and an alkali metal hydroxide.

* * * * *